United States Patent [19]

Doniger et al.

[11] 4,370,706
[45] Jan. 25, 1983

[54] CONTROLLER FOR A DUAL SERVO SYSTEM

[75] Inventors: Jerry Doniger; Albert T. Kirchhein, both of Montvale, N.J.; Gibson Reynolds, Tuxedo, N.Y.

[73] Assignee: The Bendix Corporation, Teterboro, N.J.

[21] Appl. No.: 191,231

[22] Filed: Sep. 26, 1980

[51] Int. Cl.³ .......................... G05B 9/02; G06F 11/16
[52] U.S. Cl. ...................................... 364/184; 244/194;
318/564; 364/131; 364/186; 371/68
[58] Field of Search ........ 364/184, 186, 183, 131–134;
371/9, 14, 16, 18, 20, 67, 68, 71; 244/194, 195;
318/563, 564, 565, 566, 646

[56] References Cited

U.S. PATENT DOCUMENTS

| | | | |
|---|---|---|---|
| 3,688,099 | 8/1972 | Buscher | 318/563 X |
| 4,032,757 | 6/1977 | Eccles | 318/564 X |
| 4,130,241 | 12/1978 | Meredith et al. | 318/564 X |
| 4,159,444 | 6/1979 | Bartlett et al. | 244/194 X |
| 4,209,734 | 6/1980 | Osder | 244/194 X |
| 4,217,486 | 8/1980 | Tawfik et al. | 318/564 X |
| 4,313,201 | 1/1982 | Fischer et al. | 318/564 X |

Primary Examiner—Joseph F. Ruggiero
Attorney, Agent, or Firm—Anthony F. Cuoco; Thomas L. Adams

[57] ABSTRACT

A controller (FIGS. 1, 2) is provided in a dual servo system that drives a controlled element (22) with mechanically coupled first and second servos (24 and 44). This controller has a first (10, 110, 112) and second (14, 108, 114) digital process subsystem. The first digital processing subsystem can simultaneously drive the first and second servos. This first processing subsystem is operable to measure the responsiveness of the servos to the first processing subsystem and provide a self-checking indication. The second digital processing subsystem measures the responsiveness of these servos to the first digital processing subsystem and can provide an independent indication of failure. The foregoing can be extended to multiple channels for controlling independent multiple elements such as aircraft control surfaces. Preferably, two different types of computers (10, 14; 108, 110, 112, 114) with different programs can be employed to control three control channels. Since the system can provide self-checking and independent checking of its operation, the likelihood of "multi-axis hardover" is reduced.

24 Claims, 3 Drawing Figures

CONTROLLER FOR A DUAL SERVO SYSTEM

BACKGROUND OF THE INVENTION

The present invention relates to dual servo systems and, in particular, to systems employing self-checking and independent checking of system operation.

A dual servo system has the advantage of tending to fail passively. In particular, a failed servo attempting to move incorrectly is opposed by the other servo. Consequently, the two servos are deadlocked and produce little net torque. It is known to install dual servos in an aircraft to actuate a control surface. This known system typically employs three independent dual analog control channels to control three classes of control surfaces: aileron, elevator and rudder. It has also been proposed to substitute a single digital computer for the three analog control channels. A serious drawback, however, is that a single digital computer may exhibit a generic software error or a failure mode whereunder all three control surfaces are driven to an extreme position. This type of failure is referred to herein as "multi-axis hardovers".

Therefore, there is a need for a dual servo system which may employ digital processing techniques but which is inherently reliable and avoids "multi-axis hardovers".

SUMMARY OF THE INVENTION

The present invention can provide reliability by employing two separate digital processing means. One of them controls the servos and the other performs a monitoring function. Since the two can employ different programs, the possibility of a generic software error or a common failure mode is reduced.

Therefore, in accordance with the illustrative embodiments demonstrating features and advantages of the present invention there is provided in a dual servo system a controller. This dual servo system can drive a controlled element with mechanically coupled first and second servos. This controller has first and second digital processing means. The first digital processing means can simultaneously drive the first and second servos and is operable to measure the responsiveness of the servos to the first digital processing means. This first digital processing means can provide a self-checking indication. The second digital processing means can measure the responsiveness of these servos to the first digital processing means. The second digital processing means can provide an independent indication of failure of this responsiveness.

According to an associated method of the present invention mechanically coupled dual servos are simultaneously driven with one digital device. The output torques of the two servos are compared and equalized. Also, the above digital device is monitored with another digital device having a different program.

Yet another embodiment employs four digital computers for controlling an element. Two of them separately control different ones of the pair of servos and each has the capacity to provide independent control if the other fails. The two remaining computers are used for monitoring.

The foregoing equipment can be altered from a single to a double (or more) channel system for driving first and second independent controlled elements. Each of these two channels have a pair of cooperating servos. A first digital processing means can drive the servos of one channel. Simultaneously, the servos of the other channel are driven, also by the first digital processing means. However, the servos in one channel can be driven independently of those in the other channel. A second digital processing means is operable to monitor the first digital processing means to provide an indication of its failure. The second digital processing means has an operational sequence differing from that of the first to reduce the probability of their simultaneous failure. Controllers of this type can reduce the chance of undetected multiple channel failures.

Apparatus and methods in accordance with the principles of the present invention can provide improved flight control. In one embodiment two different types of digital computers are employed, at least one of them used to check the other. One digital computer, used to directly control the dual servos, has a self-checking feature. This primary digital computer monitors and equalizes the output torque of each servo and maintains their net torque within a predetermined limit. Preferably, the net torque is limited according to the amount of deflection of the associated control surface, as may be formulated in prevailing government regulations.

In the foregoing embodiments a malfunction detected by any computer can produce various indications: a signal to alert the pilot of the failure; an automatic disengagement of the flight control system and both servos; or disengagement of the servo and digital computer that has failed with the remaining equipment providing control over one servo, assuming it has this capability.

Various signal comparisons will be performed by the preferred embodiment. For example, the output torques in a pair of servos can be compared. Also, the magnitude of the net torques from these dual servos can be compared to the measured position of a controlled element to determine whether the net torque is deemed excessive. Also, each digital computer can have a modeling feature for anticipating the servo response. The model prediction can be compared to the actual response to determine whether the system is operating satisfactorily. Furthermore, each digital computer may have an autopilot function that produces a command signal suitable for controlling the servos. Both command signals may be compared to detect failures.

The preferred embodiment employs two pairs of torque sensors, each pair being dedicated to a different computer. This embodiment also employs two independent sensors to measure mechanical displacement of the controlled element. By duplicating the various sensors, cross-checking can be used to allow detection of a single malfunctioning sensor. For embodiments wherein an aircraft control surface is mounted on a movable stabilizer (or where trim tabs are employed) supplemental sensors may be employed to sense this additional parameter. In some embodiments stabilizer position may be used to determine the maximum permissible net torque produced by the servos.

Also in the preferred embodiment, the validity of the conversion of crucial output signals from a converter may be verified by reconverting a transmitted analog signal back into a digital form and comparing it to its originating digital signal. A disparity between the two may indicate a system failure.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings wherein.

DETAILED DESCRIPTION OF THE PREFERRED EMBODIMENTS

Two of the possible embodiments of the present invention will be discussed presently. The first employs two distinct digital processors. The second embodiment employs four distinct digital processors.

FIRST EMBODIMENT

Figure 1:
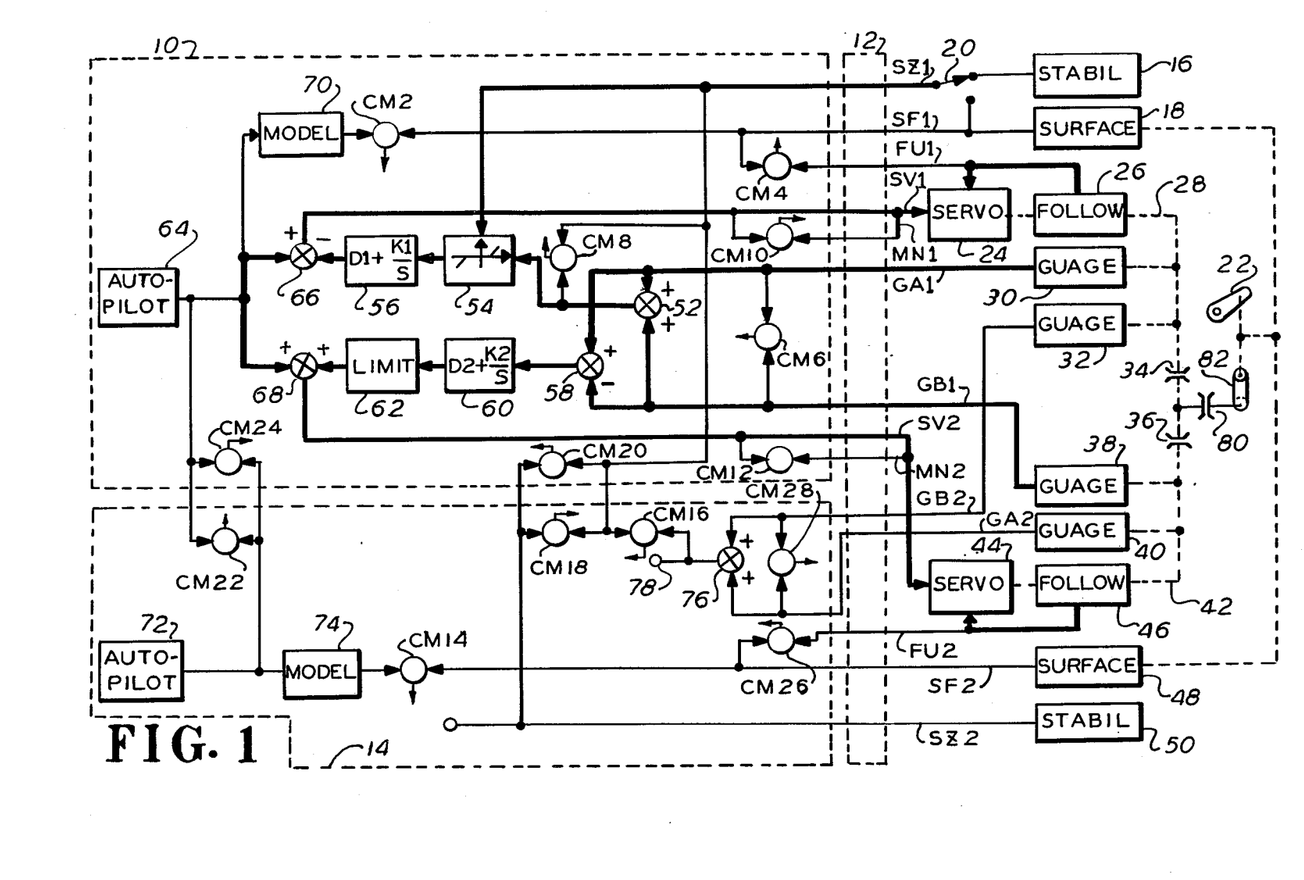
FIG. 1 is a schematic illustration of a controller according to the present invention.

Referring to FIG. 1, a controller in a dual servo system is shown comprising a first digital processing means 10. The first digital processing means in this embodiment is digital computer 10. Computer 10 is preferably a minicomputer but may take alternate forms such as a general purpose computer or a microcomputer. Computer 10 transmits and receives digital data from a digital conversion means 12 which is in this embodiment, a multiplexed, digital-to-analog and analog-to-digital conversion system.

A second digital processing means is shown herein as another digital computer 14 which is, in this embodiment, a different type of minicomputer employing a different program. Computer 14 is also coupled to conversion system 12 for transmitting and receiving external signals.

While the connection between conversion system 12 and digital computers 10 and 14 is illustrated as a multichannel arrangement, for practical embodiments it is anticipated that the signal transfer will occur over common bus lines. Therefore the multi-line representation is to be considered only a schematic suggestion of the nature of the many signals being transferred.

Line SZ1, a multiplexed analog input to converter 12, is connected to either element sensor 18 or, if applicable, element sensor 16. This alternative connection may be hard wired or, as illustrated, a switch 20 whose movable contact switches the line SZ1 to the output of either sensor 16 or 18. Sensor 18 is mechanically connected to an element, shown herein as aircraft control surface 22. In this embodiment, surface 22 is an aircraft elevator which articulates from a hydraulically rotatable stabilizer fin. Stabilizer 16 is positioned to relieve the load on elevator 22 so it can be easily adjusted. Accordingly, elevator 22 has two positional parameters: its deflection as measured by sensor 18 and the stabilizer position as measured by sensor 16. Sensors 16 and 18 may be conventional transducers producing a voltage proportional to the measured angular parameter.

A first servo is shown herein as servomechanism 24 which receives position feedback from a first servo sensor comprising transducer 26. Transducer 26 may be a potentiometer or an electromechanical device that produces a signal as a function of the displacement measured at the mechanical output 28 of servo 24. Line FU1 of conversion system 12 is connected to the junction of transducer 26 and servo 24. Servo 24, a conventional device employing rate feedback, produces a rotational displacement in proportion to the magnitude of the signal on line SV1, an output line of converter 12.

Mechanically coupled to the output 28 of servo 24 are a first primary torque sensor and first secondary torque sensor, shown herein as torque gauges 30 and 32, respectively. Gauges 30 and 32 employ strain gauges or equivalent transducers and provide on lines GA1 and GB2, respectively, a signal proportional to the torque applied by servo 24 to electromechanically actuatable clutch 34.

Mechanically coupled to the input plate of electromechanically actuatable clutch 36 is a second primary torque sensor and a second secondary torque sensor, shown herein as torque gauges 38 and 40, respectively. Gauges 30, 32, 38 and 40 are constructed identically. The outputs of gauges 38 and 40 are coupled to input lines GB1 and GA2, respectively, of converter 12. The mechanical inputs of gauges 38 and 40 are coupled to the output 42 of second servo 44, a servo identical to servo 24. Servo 44 receives position feedback from a second servo sensor 46 in the mechanical output 42 of servo 44. The input line FU2 of converter 12 is connected to the junction of sensor 46 and servo 44. The control input of servo 44 is connected to output line SV2 and input line MN2 of converter 12. The outputs of sensors 48 and 50 are connected to inputs SF2 and SZ2 of converter 12. Sensors 16, 18, 48 and 50, are identical transducers, in structure. Thus, transducer 48 measures the angular displacement of element 22 and transducer 50 the position of its associated stabilizer.

In the computers 10 and 14 the primary control lines are shown darker than the other lines which concern self-checking functions. This self-checking is illustrated by the open circular devices (without crosses), indicating comparisons between two signals. Since the above functions are performed by the computers and may be the consequence of certain logical, sequential operations and comparisons regulated by a computer program, the illustrated hard-wired connections need not continuously exist as suggested by the schematics within the computers 10 and 14.

In the computer 10 a summing device 52 has its inputs connected to lines GA1 and GB1. This device, referred to herein as a limiting means, has its output connected to deadband device 54. The transfer characteristics of device 54, as illustrated by the plot within it, produces no output until the magnitude of its input exceeds a given amount. Thereafter, the output increases from zero linearly. The size of the deadband of device 54 is regulated by the input signal on line SZ1 such that increased deflection of the stabilizer (transducer 16) corresponds to an increase in the size of the deadband of device 54. The output of device 54 is coupled to signal conditioning circuit 56 which produces an output signal having a component proportional to its input by a factor D1 and a component proportional to the integral of its input by a factor K1. In this embodiment the magnitude of this integral component is limited to avoid excessive recovery time.

An equalization means is shown herein as subtractive device 58 whose summing input is connected to line GA1 and whose subtracting input is connected to line GB1. The output of device 58 is connected to a signal conditioning device 60 which produces an output signal having a component proportional to its input by a factor D2 and a component proportional to the integral of its input by a factor K2. The output of device 60 is applied to a limiting device 62 to restrict the authority of subtracting device 58.

The computer 10 includes a command signal source shown herein as autopilot functional block 64. Autopilot 64, in a well understood manner, responds to certain aircraft equipment to determine the appropriate setting of an aircraft control surface. For example, autopilot device 64 may respond to a manually operated knob by producing a command signal which may be coupled to the ailerons to deflect them and turn the aircraft. Also, autopilot device 64 may respond to an altimeter or glide slope detector to produce an error signal for the elevators, designed to maintain the aircraft at a desired altitude or glide slope.

The output of autopilot device 64 is applied to a summing input of subtractive device 66 and additive device 68. The other summing input of summing device 68 is coupled to the output of limiting device 62. The output of signal conditioning device 56 is coupled to the subtracting input of subtractive device 66. The outputs of devices 66 and 68 are coupled to lines SV1 and SV2, respectively.

The output of autopilot device 64 is also connected to the input of a model means shown schematically herein as device 70 which produces an output that simulates the expected response of a servo such as servo 24 to autopilot 64. A comparison is made by comparison device CM2 between the output of modeling device 70 and the output on line SF1 of element sensor 18. Comparison device CM2 determines if the disparity between its respective inputs exceeds a predetermined maximum and if it does, responds by disabling the flight control system of the computer 10 and by disengaging clutches 34 and 36 electromechanically. Each of the other comparison devices bearing the prefix CM described herein produce the same response when an improper comparison is perceived by it.

A comparison means is shown herein as comparison device CM4 which is connected between lines SF1 and FU1. Device CM4 determines whether the position of element 22 as sensed by transducer 18 is following the mechanical output of servo 24 as sensed by transducer 26. If these two disagree, by an amount in excess of a present maximum, it indicates that element 22 is moving independently of servo 24 due to slippage or some other disturbance.

Another comparison device CM6 compares the difference in the outputs of torque gauges 30 and 38 to determine whether the output torques of servos 24 and 44 are balanced. If they are unbalanced by a predetermined amount, the comparison device CM6 disengages clutches 34 and 36. Another comparison device CM8 is shown schematically connected between the output of summing device 52 and line SZ1. Comparison device CM8 determines whether the net torque as measured by device 52 is excessive in view of the element position as indicated by the signal on line SZ1.

A return means, shown herein as a comparison device CM10, is connected between lines SV1 and MN1. Thus connected the comparison device CM10 can detect a disparity between digital data applied to converter 12 (line SV1) and the same data reconverted by converter 12 (line MN1). A failure to reconvert back to the same digital information indicates a transmission failure. A similar return means, shown herein as comparison device CM12, is connected between lines SV2 and MN2. Again, comparison device CM12 determines if there is a disparity between the transmitted and returned digital data passing through converter 12.

Digital processing means 14 is shown having a command signal source, illustrated as device 72. The function of device 72 is similar to that of autopilot device 64. Device 72 drives model means 74 which functions similar to model device 70. Comparison device CM14 is coupled between the output of model device 74 and output line SF2 of element sensor 48. Comparison device CM14 detects a disparity between the prediction of model device 74 and the actual element position sensed by sensor 48, in excess of a predetermined maximum.

A summing device 76 is shown herein with its two summing inputs separately connected to lines GA2 and GB2 to provide on output terminal 78 a signal signifying the net torque produced by servos 24 and 44. Comparison device CM16 is coupled between terminal 78 and line SZ1 to perform a function analogous to device CM8. While the connection between device CM16 and line SZ1 is shown routed through digital computer 10 such routing is unnecessary and, instead, routing may be directly (and separately) through converter 12.

Also in this manner, comparison device CM18, coupled between lines SZ2 and SZ1, makes a comparison between the stabilizer position signal from element sensor 50 and the stabilizer position signal from element sensor 16. Coupled in parallel with device CM18 and operating identically thereto is comparison device CM20 of the digital computer 10. Coupled in parallel between the outputs of autopilot devices 64 and 72 are two checking means, shown herein as comparison devices CM22 and CM24 of the computers 14 and 10, respectively. Comparison devices CM18, CM20, CM22 and CM24 respond to a difference in their respective inputs in excess of predetermined limits to provide a failure indication. Again, a direct interconnection between digital computes 10 and 14 is unnecessary since data can be separately transmitted through converter 12.

A comparison means, shown herein as comparison device CM26 connected between lines FU2 and SF2, detects a lack of correspondence between the mechanical output 42 of servo 44 (transducer 46) and the mechanical position of element 22 (transducer 48). Comparison device CM28, coupled between the inputs of summing device 76, detects an imbalance in torque similar to device CM6.

SECOND EMBODIMENT

Figure 2:
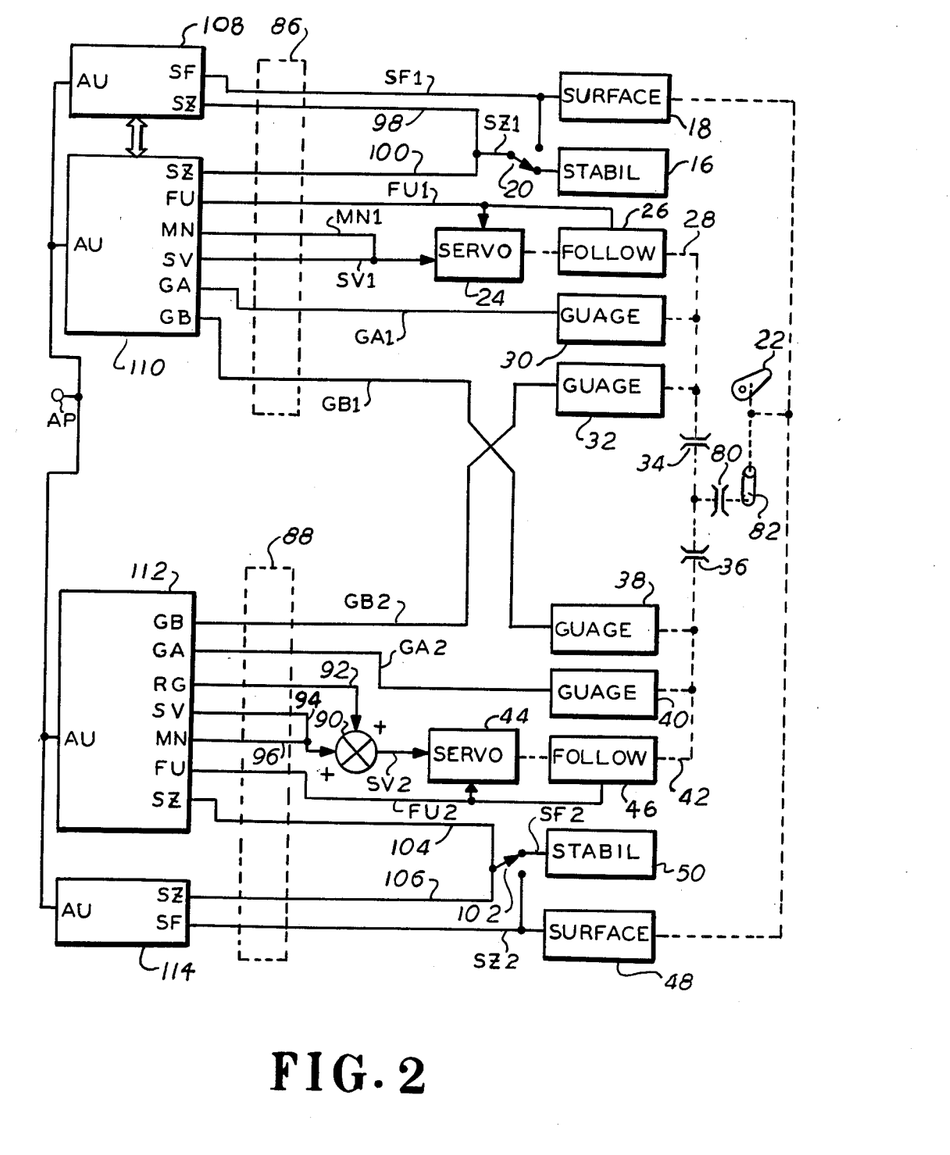
FIG. 2 is a schematic illustration of an alternate controller according to the present invention.

In FIG. 2 an alternate controller is illustrated which employs multiplexed conversion devices 86 and 88. Each of these devices is electrically isolated from each other and operates similarly to converter 12 of FIG. 1. The equipment to the right of conversion devices 86 and 88 is substantially identical to the equipment to the right of conversion device 12 of FIG. 1 with the following exceptions: input SV2 of servo 44 is coupled to the output of summing device 90 whose summing inputs are connected to lines 92 and 94, return line 96 being coupled from line 94 back through conversion device 88. Also the movable contact of switch 20 is fed back through conversion device 86 by two alternate lines 98 and 100. Also an additional switch 102 has two fixed contacts separately connected to the outputs SF2 and SZ2 of element sensors 50 and 48, respectively. The movable contact of switch 102 is fed back to conversion device 88 through two alternate lines 104 and 106.

The foregoing equipment is coupled through conversion device 86 to a first processor 108, a first execution means 110 and, through conversion device 88, to a second execution means 112 and a second processor 114. Processors 108 and 114 comprise a similar type of integrated digital processor. Also, execution means 110 and 112 comprise similar digital processors but of a circuit type different from that of processors 108 and 114. Processors 108, 110, 112 and 114, arranged as four minicomputers, each has an input terminal AU which is commonly connected to terminal AP which receives an external autopilot signal calculated by another computing device. Digital computer 108 has its terminals SF and SZ connected to lines SF1 and 98, respectively. Digital computer 110 has its terminals SZ, FU, MN, SV, GA and GB connected to lines 100, FU1, MN1, SV1, GA1 and GB1, respectively. Computer 112 has its terminals GB, GA, RG, SV, MN, FU and SZ connected to lines GB2, GA2, 92, 94, 96, FU2 and 104, respectively. Computer 114 has terminals SZ and SF which are connected to lines 106 and SZ2, respectively.

It will be observed that the computers 108 and 110 are electrically isolated from computers 112 and 114. Accordingly, an electrical failure of a computer in one channel does not by itself disable the other channel.

Figure 3:
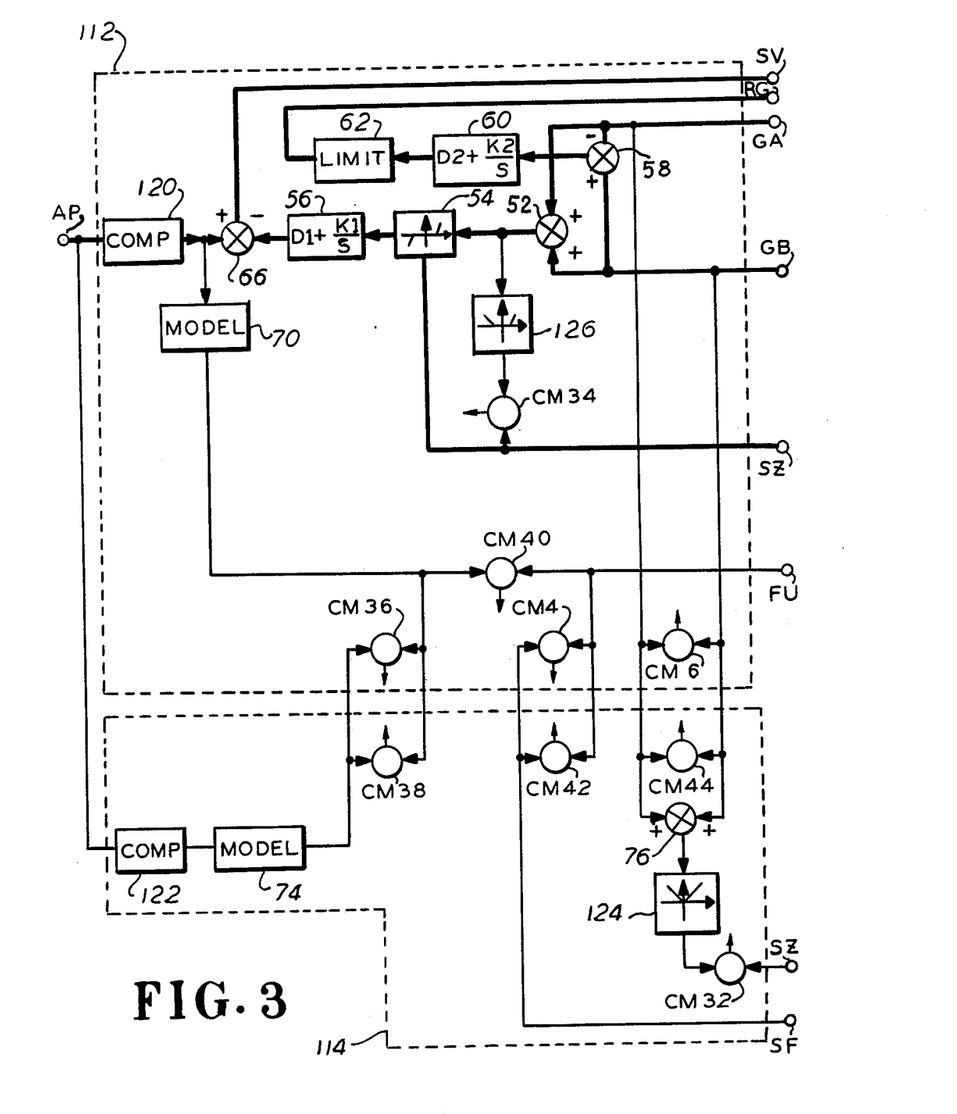
FIG. 3 is a more detailed schematic illustration of a portion of the controller of FIG. 2.

Referring to FIG. 3, a detailed functional schematic is illustrated for computers 112 and 114 of FIG. 2. Again, this schematic illustrates functional features produced by the programs of the digital computers and does not necessarily represent specific hardwiring between discrete components. It is to be appreciated that computer 110 of FIG. 2 is substantially identical to computer 112 except that functions associated with its line RG are not duplicated. The subtracting and summing terminals of subtractive device 58 are connected to lines GA and GB, respectively. Device 58 drives conditioning device 60 and limit device 62, these two devices being structurally and functionally similar to the identically numbered devices of FIG. 1. The output of limit device 62 is applied to line RG. Summing device 52 has its summing inputs separately connected to line GA and GB. The output of summing device 52 drives devices 54, 56 and 66, all of which are structurally and functionally similar to the identically numbered devices of FIG. 1. The summing terminal of subtractive device 66 is coupled to the output of local computation device 120 whose input terminal AP receives a signal from an external computing device. The output of computation device 120 is functionally identical to that of autopilot device 64 of FIG. 1. The output of subtractive device 66 is coupled to line SV. The output of computing device 120 is coupled to the input of model device 70 which is similar to the identically numbered device of FIG. 1. The computer 114 has computation device 122 and model device 74 whose function is identical to devices 120 and 70, respectively, of digital computer 112. The computer 114 has a summing device 76 whose inputs are separately coupled to lines GA and GB. Device 76 operates similarly to the identically numbered device of FIG. 1. The output of device 76, corresponding to the measured net torque, is passed through an absoluting device 124 which produces an output that is the absolute value of its input. This signal is applied to comparison device CM32 which makes a comparison to the signal on line SZ. By reference to FIG. 2 it will be observed that the signal on line SZ corresponds to the stabilizer position. Stabilizer position is used, in a manner similar to device CM16 of FIG. 1, as a standard for determining the maximum net torque. Absoluting device 126 and comparison device CM34 of the computer 112 operate similarly to devices 124 and CM32, respectively, of the computer 114.

Comparison devices herein bearing the prefix CM can respond in various fashions, including those described for the comparison devices of FIG. 1. In this embodiment a failure detected by a comparison device of one digital computer causes disengagement of clutches 34 and 36 (FIG. 2). But, the pilot can reselect one of the clutches, which will remain engaged if its associated equipment is functioning properly. This feature renders the system redundant.

The outputs of model devices 70 and 74 are simultaneously compared by comparison devices CM36 and CM38 to determine whether their difference exceeds a preset limit. The output of model device 70 is compared by comparison device CM40 to the signal on line FU. By referring to FIG. 2 it will be observed that the signal on line FU is a position signal signifying the mechanical output of one servo. Accordingly, the actual servo response as indicated by line FU is compared to the prediction of model device 70. Comparison devices CM4 and CM6 are functionally and structurally similar to the identically numbered devices of FIG. 1. Also, comparison devices CM42 and CM44 provide a function identical to that of devices CM4 and CM6, respectively, but are located in computer 114 instead of computer 112.

As was the case in FIG. 1, the digital computers illustrated in FIG. 3 do not necessarily have the separate interconnections as shown. Instead, the signals may be multiplexed to a common bus line. Furthermore, this common bus line may be used for interchanging data between the digital computers and conversion devices 86 and 88, (FIG. 2).

OPERATION

To facilitate an understanding of the apparatus of FIG. 1, its operation will be briefly described in an automatic flight control system. Although only one channel is illustrated, the apparatus to the right of conversion device 12 may be duplicated to control additional aircraft control surfaces. In this event computers 10 and 14 provide duplicate functions for the additional aircraft control surfaces by supplementing its program to interact with the additional inputs from these other channels. As previously mentioned for a channel controlling an aileron, switch 20 will be in a position opposite to that illustrated since there will not be a stabilizer signal in this situation. In a preferred embodiment three channels are controlled by computers 10 and 14: aileron, rudder and elevator. It is also to be appreciated that computers 10 and 14 have sufficient capacity and memory for controlling these three channels without the need for additional processing equipment. Accordingly, the above increase in capacity for three channels does not involve adding computers but supplementing of the programmed functions of computers 10 and 14.

The following will consider the control of an elevator channel during flight to maintain a constant altitude (or alternatively to follow a glide slope). The desired elevator position is calculated by autopilot device 64 in a conventional manner in response to an external altimeter (not shown). A signal from autopilot device 64 is coupled through devices 66 and 68 to servos 24 and 44, it being assumed for now that devices 66, 68 do not alter the signal from autopilot device 64. Servos 24 and 44 respond to this command signal by proportionally positioning their respective output shafts 28 and 42, transducers 26 and 46 providing positional feedback. The torques from servos 24 and 44 are coupled through clutches 34 and 36 to clutch 80 which drives aircraft cables 82 to control the position of control surface 22.

If the torque produced by servos 24 and 44 differ, the torque signals from gauges 30 and 38 produce a signal from subtractive device 58 proportional to that difference. This difference signal is conditioned and limited by devices 60 and 62 and is applied as a correction signal to summing device 68. Thus, if servo 44 produces an excessive torque, gauge 38 produces a relatively large signal causing device 58 to couple a negative signal through device 68 to reduce the signal on line SV2 applied to servo 44 and equalize the torque between servos 24 and 44.

Also, summing device 52 sums the torque measured by gauges 30 and 38 and transfers a signal proportional to net torque to device 54. Device 54, having a dead zone sized in accordance with the stabilizer position measured by sensor 16, produces no further effect until the net torque exceeds the dead zone of device 54. If the net torque exceeds this dead zone threshold then a negative feedback signal is coupled to subtractive device 66 to reduce the drive to servo 24 on line SV1. Since the torques are equalized as previously described, reducing the torque of servo 24 similarly reduces the torque of servo 44. This feature is significant since aircraft regulations require that the torque from an automatic flight control system be limited so that the pilot can manually overcome the servos. Since this permissible net torque varies with the amount of deflection of the associated control surface or its stabilizer, this information is fed back to device 54 on line SZ1 to alter the maximum permitted net torque.

It will now be assumed that servo 24 falls and produces its full torque in one direction (hardover). Not having failed, servo 44 produces a counter-torque since its drive signal is unchanged and it will attempt to hold the position commanded by autopilot device 64. Consequently, since both devices have the same torque rating the net torque applied to clutch 80 is approximately zero. It will be observed that during such failure the torques from servos 24 and 44 are maximally different. However, this situation does not weaken servo 44 since the extent of correction allowed by limiting device 62 is relatively small. At this time, comparison device CM6 responds to this extreme difference in torque by disengaging clutches 34 and 36. Therefore, the foregoing failure does not drive control surface 22 to an extreme position while the self-checking feature causes automatic disengagement of the automatic flight control system.

For other types of failures the other comparison devices having the generic prefix CM can also respond and disengage clutches 34 and 36. Since the characteristics of these comparison devices were described previously their specific operation will not be repeated.

It will be appreciated that the operation of the apparatus of FIGS. 2 and 3 is similar. However, in this latter embodiment, the equipment is partitioned differently. Also, the computers 110 and 112 independently provide separate control signals to servos 24 and 44, respectively. The computer 112 also performs the function of equalizing the servos by transmitting an equalization signal to servo 44 on line 92. This equalization signal is combined in summing device 90 with the servo control signal of line 94 to provide a corrected signal to servo 44. In addition, the computers 110 and 112 both sum the torque measurements produced by their associated gauges to limit the magnitude of the servo control signal transmitted on lines SV1 and 94 (FIG. 3). The characteristics of various comparison devices of the computers 108, 110, 112 and 114 having been previously given, their operation will not be repeated.

A significant feature of the apparatus of FIG. 2 is that it provides true redundancy. In the event that one of the complimentary systems fail, the other is substituted therefor.

For example, assume that servo 24 of FIG. 2 has failed and is producing a large erroneous torque. In a manner similar to that previously described, servo 44 produces a counterbalancing torque so that the net torque applied to clutch 80 is relatively small. This failed condition is sensed by either comparison device CM6 or CM44 (FIG. 3) or by corresponding comparison devices in the computers 108 and 110 to cause automatic disengagement of clutches 34 and 36. Subsequently, the pilot can reengage clutch 36 allowing servo 44 to perform the task of automatic flight control alone. In this situation the torque required of servo 44 will double, however, computers 112 and 114 respond to this new condition and alter the operation to allow greater torque. Since torque equalization is no longer required, the signal from device 62 is eliminated.

It is to be appreciated that various modifications may be implemented with respect to the above described embodiments. For example, various integrated digital processing circuits may be employed. It is expected that for some embodiments each of the digital processors will be of a different type. Furthermore, various positional and torque sensors can be employed to provide the signals used herein. Also, while positioning of an aircraft control surface is described herein the foregoing principles may be applied to other environments. Furthermore, numerous programs may be implemented to produce the functions described above. These various programs can alter the order in which various routines are executed and the repetition rate of execution. Also in other embodiments some of the comparison functions previously described may be eliminated for simplicity. These comparison devices can effect the system in various ways and for redundant systems may cause an automatic transfer of control to one servo which has not failed. Moreover, in some embodiments other operating parameters of the servo system may be measured and used to regulate the servo response. It is also expected that numerous circuit modifications will be implemented depending upon the desired speed, accuracy, power, etc.

Obviously, may other modifications and variations of the present invention are possible in light of the above teachings. It is therefore to be understood that within the scope of the appended claims, the invention may be practiced otherwise than as specifically described.

What is claimed is:

1. In a dual servo system for driving a controlled element with mechanically coupled first and second servos in response to a pair of control signals separately applied thereto, said servos cooperating with a sensing means for providing a signal signifying on operating parameter associated with at least one of said servos, a controller comprising:

first digital processing means connected to said first and second servos for simultaneously driving them by providing to each a corresponding one of said control signals, said first digital processing means being operable to measure the responsiveness of said servos to said first digital processing means to provide a self-checking indication; and second digital processing means connected to said first digital processing means for measuring the responsiveness of said servos to said first digital processing means to provide an independent indication of failure of said responsiveness, said independent indication being provided by at least one signal comparison, examining the signal of said sensing means but neither of said control signals.

2. In a dual servo system according to claim 1, wherein said first processing means responds to digital data derived from said servos for providing said self-checking indication.

3. In a dual servo system according to claim 2, wherein said first and second digital processing means each have a different program for controlling its sequence of operation, said first digital processing means having with respect to said second digital processing means, exclusive programming steps for transmitting signals suitable for controlling said servos.

4. In a dual servo system according to claims 1 or 3, wherein said first and second digital processing means each comprise an integrated processing circuit having different structure.

5. In a dual servo system according to claim 1, wherein said sensing means comprises first and second primary torque sensors separately connected to the mechanical outputs of said first and second servos, respectively, for measuring torque from said servos, said first and second primary torque sensors being operable to provide first and second primary torque signals, respectively, signifying measured torque, and wherein said first processing means comprises:

equalization means connected to said first and second primary torque sensors and responsive to the measured torques from said servos, said equalization means being responsive to said primary torque signals for balancing the magnitude of the output torques of said servos.

6. In a dual servo system according to claim 5, wherein said first digital processing means further comprises:

limit means connected to said first and second primary torque sensors and responsive to said primary torque signals for limiting the magnitude of the net torque applied by said servos to said element.

7. In a dual servo system according to claim 1, wherein said first digital processing means comprises:

first and second execution means for driving said first and second servos, respectively, and said second digital processing means comprises:

first and second processors for monitoring the responsiveness of said first and second servos, respectively, to said first digital processing means.

8. In a dual servo system according to claim 7, wherein said first and second execution means are electrically isolated.

9. In a dual servo system according to claim 7, wherein said first and second digital processing means each has a different program for controlling its respective sequence of operation.

10. In a dual servo system according to claim 6, wherein said sensing means includes an element sensor for providing a positional signal signifying a given positional parameter of said element, said limit means being operative to alter the extent to which it limits said net torque in response to said positional signal, said system including:

first and second secondary torque sensors separately coupled to the mechanical outputs of said first and second servos, respectively, to measure torque, said first and second secondary torque sensors being operable to provide first and second secondary torque signals, respectively, signifying measured torque, said second processing means being connected to said secondary torque sensors to measure the net torque provided by said servos, said second processing means providing said indication of failure in response to said net torque exceeding a value bearing a predetermined relation to said positional signal.

11. In a dual servo system according to claim 10, wherein said second processing means is operative to provide said indication of failure in response to the difference between said secondary torque signals exceeding a predetermined magnitude.

12. In a dual servo system according to claim 5, wherein said first and second digital processing means each include:

a command signal source for producing a command signal, said equalization means of said first digital processing means being connected to its command signal source, said second digital processing means providing said indication of failure in response to its command signal differing from that of said first digital processing means by a given amount.

13. In a dual servo system according to claim 1, wherein said first and second digital processing means each includes:

a command signal source; and model means connected to said command signal source, said model means being driven by said command signal, said model means having a predetermined response characteristic dimensioned to produce a model signal simulating the response one of said servos would have if driven directly by said command signal, said second digital processing means being operable to provide said indication of failure in response to its model signal differing from that of said first digital processing means by a predetermined amount, so that the consistency of processing performed in said first and second processing means can be checked independently of the response of said servos through said model means.

14. In a dual servo system according to claim 13, wherein said sensing means includes a first and second servo sensor for providing a first and second servo sensor signal, respectively, signifying mechanical displacement in the output of said first and second servo, respectively, and wherein said second digital processing means is operable to provide said indication of failure in response to its model signal differing from said second servo sensor signal by more than a given amount.

15. In a dual servo system according to claim 2, wherein said first digital processing means includes:

digital conversion means connected to the first processing means and responsive to a primary digital signal provided within said first processing means for transmitting a corresponding analog signal to said servos; and return means connected to said digital conversion means for reconverting said analog signal to a digital form, said first processing means being responsive to a disparity between said primary digital signal and said digital form of said analog signal.

16. In a dual servo system according to claim 1, wherein said sensing means includes first and second servo sensors for providing first and second servo sensor signals, respectively, signifying mechanical displacement in the output of said first and second servo, respectively, and wherein said system further comprises an element sensor for providing a positional signal signifying a given positional parameter of said element, and wherein said first and second processing means each comprise:
   comparison means connected to said element sensor and responsive to said positional signal and to a corresponding one of said servo sensor signals for measuring the correspondence between the element and said corresponding one of said servos.

17. In a dual servo system according to claim 16, wherein said element sensor includes a pair of independent element sensors for providing a pair of positional signals both signifying a given positional parameter of said element, said first and second processing means each comprising:
   checking means connected to said pair of independent element sensors for providing a fault signal in response to said pair of positional signals differing by a preset amount.

18. In a dual servo system according to claim 5, wherein said first processing means provides said self checking indication in response to the difference in magnitude of the torque provided by said servos exceeding a predetermined magnitude.

19. In a dual servo system according to claim 18, wherein said first and second processing means each comprise:
   means coupled to said element for providing a fault signal in response to the net torque applied to said element exceeding a limit bearing a predetermined relationship to the position of said element.

20. In a dual channel system having a first and second pair of cooperating servos for driving first and second independent controlled elements, respectively, said servos being operable in response to control signals applied thereto, at least one of said servos cooperating with a sensing means, said sensing means being operable to provide a signal signifying an operating parameter associated with said at least one of said servos, a controller, including apparatus for avoiding undetected multiple channel failures comprising:
   first digital processing means for simultaneously driving said first pair of servos and for simultaneously driving said second pair of servos, by providing to each of the servos a corresponding one of the control signals, said first and second controlled elements being driven independently; and
   second digital processing means connected to said first digital processing means and arranged to perform a sequence of programming steps differing from that of said first digital processing means to reduce the probability of their simultaneous failure, said second digital processing means being operable to monitor said first digital processing means to provide an independent indication of its failure, said independent indication being provided by a signal comparison examining the signal of said sensing means but none of said control signals.

21. In a dual channel system according to claim 20, wherein said first and second processing means each have a different, stored, processing program for controlling it.

22. In a dual channel system according to claims 20 or 21, wherein said first and second processing means each comprise an integrated processing circuit having a different structure.

23. A method for controlling mechanically coupled dual servos, comprising the steps of:
   simultaneously driving said servos with one digital device;
   monitoring said one digital device with another digital device having a different program; and
   comparing and equalizing the output torques of each servo with said one device but not the other.

24. A method according to claim 23, further comprising the step of:
   measuring the net output torque produced by said servos; and
   limiting the magnitude of said net output torque.

* * * * *